United States Patent
Shah et al.

(10) Patent No.: US 7,904,339 B2
(45) Date of Patent: Mar. 8, 2011

(54) EXTENSIBLE FRAMEWORK FOR SUPPORTING DIFFERENT MODES OF PAYMENTS

(75) Inventors: Mehul Y. Shah, Redmond, WA (US); Himanshu Lal, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 42 days.

(21) Appl. No.: 12/143,716

(22) Filed: Jun. 20, 2008

(65) Prior Publication Data
US 2009/0319382 A1 Dec. 24, 2009

(51) Int. Cl.
*G06Q 20/00* (2006.01)
*G06K 15/00* (2006.01)
*G07G 1/00* (2006.01)

(52) U.S. Cl. ............... 705/16; 235/383; 705/14
(58) Field of Classification Search ............ 705/14
See application file for complete search history.

(56) References Cited

U.S. PATENT DOCUMENTS

| | | | |
|---|---|---|---|
| 5,983,208 A | 11/1999 | Haller et al. | |
| 6,061,665 A | 5/2000 | Bahreman | |
| 7,086,584 B2 | 8/2006 | Stoutenburg et al. | |
| 7,344,070 B2 * | 3/2008 | Nobutani | 235/383 |
| 2006/0149671 A1 | 7/2006 | Nix et al. | |
| 2007/0005685 A1 | 1/2007 | Chau et al. | |
| 2007/0094085 A1 | 4/2007 | Redmond et al. | |
| 2007/0233573 A1 | 10/2007 | Wang et al. | |
| 2007/0267479 A1 | 11/2007 | Nix et al. | |
| 2008/0195465 A1 * | 8/2008 | Redmond et al. | 705/14 |

OTHER PUBLICATIONS

"E-xact Transactions," http://www.renaissance-associates.com/images/Additional%20PDF%20Files/Exact%20Solutions%20Overview.pdf [last accessed Nov. 10, 2008].
"Payment Object Framework-Revised Submission," http://www.omg.org/docs/ec/99-02-02.pdf [last accessed Nov. 10, 2008].
Bellare, Mihir et al., "Design, Implementation and Deployment of the iKP Secure Electronic Payment System," IEEE Journal of Selected Areas in Communications, vol. 18, No. 4, Apr. 2000, pp. 1-20, http://www.cs.biu.ac.il/~herzbea/Papers/Payments/bellare00iKPdesign.pdf [last accessed Nov. 10, 2008].
Fischer, Ing, "Towards a Generalized Payment Model for Internet Services," Sep. 2002, 125 pages, http://www.infosys.tuwien.ac.at/teaching/thesis/online/Fischer/Fischer.pdf [last accessed Nov. 10, 2008].

* cited by examiner

*Primary Examiner* — F. Ryan Zeender
*Assistant Examiner* — Denisse Ortiz Roman
(74) *Attorney, Agent, or Firm* — Perkins Coie LLP

(57) ABSTRACT

A method and system for providing an extensible framework for a POS application is provided. A POS application may be extended using a payment format add-in, a workflow add-in, a financial services provider add-in, or a combination of add-ins. A payment format add-in provides support for a payment format not included in the payment formats built into the POS application. A workflow add-in provides a configurable workflow that can be used to extend a built-in payment format or a payment format add-in. A financial services provider add-in provides support for interacting with a financial services provider for which the POS application does not provide built-in support. Each add-in can implement, for example, logic for processing a payment transaction, a portion of a payment transaction, and configuring steps for processing a payment transaction.

20 Claims, 13 Drawing Sheets

FIG. 1

| format: | credit card ▼ |
| | cash |
| | check |
| | credit card |

110

| method: | MasterCard ▼ |
| | American Express |
| | MasterCard |
| | Visa |

120

(configure) 130  (new) 140

100

---

FIG. 2 name: [ MasterCard ]

220 ☒ swipe card
221 ☐ key in credit card number and expiration date
222 ☒ check photo ID
223 ☐ acquire CVV
224 ☒ print receipt
225 ☒ require signature (done) 230

- format: [dropdown 1020]
  - account
  - cash
  - credit card
  - other → [1025]
    - debit
    - loyalty
    - addin3
    - ⋮
    - addinN
- currency: [dropdown 1030]
  - US dollar
  - Canadian dollar
  - Euro
- max amount: [1040]
- continue [1050]

FIG. 11

- available workflows: [dropdown 1110]
  - debit workflow1
  - debit workflow1
  - debit workflow2
  - debit workflow3
- continue [1120]

FIG. 12

- name: MasterCard debit [1205]
- select financial services provider: [dropdown 1210]
  - TSYS
  - First Data Corp.
  - Global
  - ⋮
  - TSYS
- 1220 ☐ require Social Security number
- 1221 ☒ require photo ID
- 1222 ☐ require biometric data
- 1223 ☐ require two forms of photo ID
- 1224 ☒ require CVV
- 1225 ☒ print receipt
- 1226 ☒ require signature
- done [1230]

EXTENSIBLE FRAMEWORK FOR SUPPORTING DIFFERENT MODES OF PAYMENTS

BACKGROUND

Retail businesses often use a point of sale ("POS") system at checkout to automate customer transactions. These POS systems often include a POS application designed to process transactions, accept payments, perform complex tasks such as managing inventory or tracking customers, and so on. POS applications typically support a predefined number of payment formats, such as cash, credit cards, gift cards, and checks. For each payment format, the POS application has an associated set of workflows for processing payment transactions, such as tender transactions, split tender transactions, return transactions, void transactions, and so on. A workflow defines a set of steps, including some optional steps, for processing a payment transaction. For example, a workflow for processing a tender payment transaction involving a credit card may include steps such as swiping a credit card through a Magnetic Stripe Reader ("MSR"), keying in a credit card number and expiration date, checking photo identification, checking a Card Verification Value ("CVV"), sending information to a financial services provider for authorization, printing a receipt, and verifying a customer's signature. For each payment format, a POS application may support a number of configured instances of the associated workflow. The POS application uses these configured workflow instances, or "payment methods," to process payment transactions. For example, a MasterCard credit card payment method may include swiping a credit card, checking photo identification, sending information to a financial services provider for authorization, printing a receipt, and verifying a customer's signature. As another example, an American Express credit card payment method may include keying in credit card information, acquiring a CVV, sending information to a financial services provider for authorization, printing a receipt, and verifying a customer's signature. Additionally, a POS application may allow a user to configure a new payment method by selecting options associated with a payment format workflow. For example, a merchant may add a "telephone" credit card payment method that only requires keying in credit card information and obtaining a CVV.

FIGS. 1 and 2 are display pages illustrating user interface screens a typical POS application may use to allow a user to select and configure options for a payment format workflow. FIG. 1 shows display page 100, generated by the POS application, which includes a list of available payment formats 110. Upon selection of a payment format, the POS application may populate drop-down list 120 with the available payment methods associated with the selected payment format, in this example, a credit card payment format. After selecting a payment method, the user may click "configure" button 130. Alternatively, if the user wishes to configure a new instance of the payment format workflow, the user may click "new" button 140 after selecting a payment format. FIG. 2 shows display page 200, generated by the POS application, which includes the current selection of workflow options 220-225 associated with the payment method selected in FIG. 1. Had the user clicked "new" button 140 on display page 100, the POS application may display a page similar to display page 200 but with each of the workflow options unselected or selected according to default settings and without a payment method name. Display page 200 allows a user to adjust the workflow options associated with a payment method. When the user clicks "done" button 230, the POS application stores the currently selected workflow options so that the POS application can use the payment method to process payment transactions using the selected options.

FIGS. 3-5 are display pages illustrating user interface screens a typical POS application may use to process a tender payment transaction. FIG. 3 shows display page 300, generated by the POS application, which includes a list of available payment formats 301-303 and a text box 310 where a user can enter an amount for the payment transaction. Once the user has selected a payment format and an amount, the user may click "tender" button 320. In this example, the user has selected the credit card payment format. FIG. 4 shows display page 400, generated by the POS application, which includes a list of supported credit card payment methods 401-403. Once the user has selected a payment method, the user may click "tender" button 420. FIG. 5 shows display page 500, generated by the POS application, which includes instructions 501-504 for processing the payment transaction using the selected payment method. These instructions may include instructions common to all payment methods associated with the selected payment format. For example, a debit card workflow may always instruct a user (i.e., a cashier) to acquire a PIN for a tender payment transaction. Once the steps are completed, the user may click "done" button 510 to finalize the transaction.

POS applications may be preconfigured to support a predetermined number of payment formats and payment methods. Because POS applications from different providers support different payment options, a merchant may find it difficult to find a POS application that supports each of the payment options the merchant needs to support its customer base. For example, a merchant may have customers that pay with various credit cards, customers that pay with food stamps, and customers that pay with checks. If the merchant cannot find a POS application that supports all of these payment formats, the merchant may risk losing customers. Additionally, new payment formats and payment methods that a merchant would like to support may be developed or become more common. For example, a merchant may wish to support loyalty cards to reward loyal customers. As another example, a government may issue Electronic Benefit Transfer ("EBT") payment cards to victims after a natural disaster. As another example, a new credit card may require biometric data to process a payment transaction. Merchants may also encounter different payment options as they expand into new markets where different payment options are more common.

Some POS applications provide limited support for customizing options for built-in payment formats and payment methods. For example, a POS application may allow a merchant to rename a payment method or select whether a signature is required during a payment transaction. However, merchants can only customize the payment options provided by the POS application provider and typically have no ability to incorporate additional payment formats or payment methods that are beyond the scope of the configurable options the POS application provides. Similarly, merchants cannot configure payment methods to use financial services providers that the POS application does not support. Some POS application providers may offer periodic updates to POS applications. For example, merchants may be able to download and install upgrades to the POS application from a website. Merchants, however, typically cannot extend POS applications to support additional workflows beyond configuring options for the predefined workflows. Thus, merchants using the POS application need to wait until the POS application provider chooses to incorporate new payment formats, payment methods, and financial services providers into the application.

Processing a payment transaction may require interaction with a financial services provider, such as Total System Service, Inc. ("TSYS") or First Data Corporation ("FDC"). For example, a credit card tender payment transaction may include verifying credit card and account balance information with a financial services provider to authorize a transaction prior to completing the transaction. Different financial services providers offer different services and at different rates. A merchant may find it beneficial to establish relationships with different financial services providers and use the services of each when most appropriate. POS applications provide support for a predefined number of financial services providers. In the same way that POS applications limit the payment formats and payment methods that a merchant can support, POS applications limit the merchant's ability to use the services of different financial services providers. Additionally, a POS application can only support payment transactions supported by the financial services providers available to a POS application. If, for some reason, a financial services provider were to become unavailable, a POS application may no longer be able to process certain payment transactions.

SUMMARY

A method and system for providing an extensible framework for a POS application is provided. A POS application may be extended using a payment format add-in, a workflow add-in, a financial services provider add-in, or a combination of add-ins. A payment format add-in provides support for a payment format not included in the payment formats built into the POS application. For example, a POS application that does not support payments via loyalty cards may be extended using a loyalty payment format add-in. A workflow add-in provides a configurable workflow that can be used to extend a built-in payment format or a payment format add-in. For example, a workflow add-in may provide support for a new type of credit card to a POS application that provides built-in support for credit cards while another workflow add-in provides support for a new type of loyalty payment method to a POS application that supports loyalty payments through a loyalty payment format add-in. A financial services provider add-in provides support for interacting with a financial services provider for which the POS application does not provide built-in support. For example, a POS application with built-in support for TSYS and FDC can be extended to support Global Payments and SiNSYS using financial services provider add-ins. Each add-in can implement, for example, logic for processing a payment transaction, a portion of a payment transaction, and configuring steps in the processing of a payment transaction. Add-ins allow a merchant to extend a POS application to support additional payment options without waiting for a new version of the POS application to be developed.

BRIEF DESCRIPTION OF THE DRAWINGS

FIGS. 1 and 2 are display pages illustrating user interface screens a typical POS application may use to allow a user to select options for a payment format workflow.

FIG. 10 is a display page illustrating a dialog generated by the POS application for selecting a payment format when configuring a payment method in some embodiments.

FIG. 11 is a display page illustrating a dialog generated by a payment format add-in for selecting a workflow when configuring a payment method in some embodiments.

FIG. 12 is a display page illustrating a dialog generated by a workflow add-in for configuring a workflow for processing payment transactions in some embodiments.

DETAILED DESCRIPTION

Figure 3:
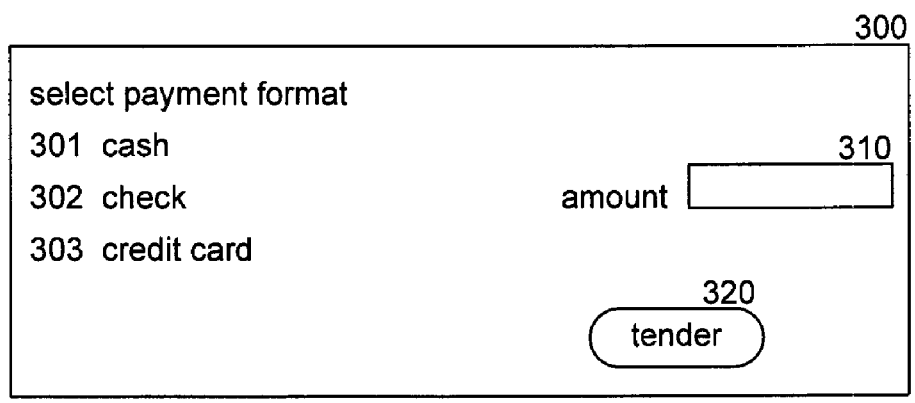
FIGS. 3-5 are display pages illustrating user interface screens a typical POS application may use to process a tender payment transaction.
Figure 4:
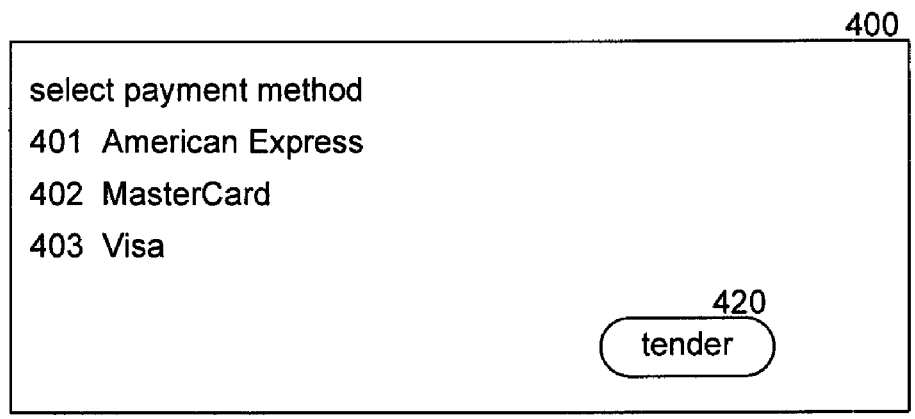
Figure 5:
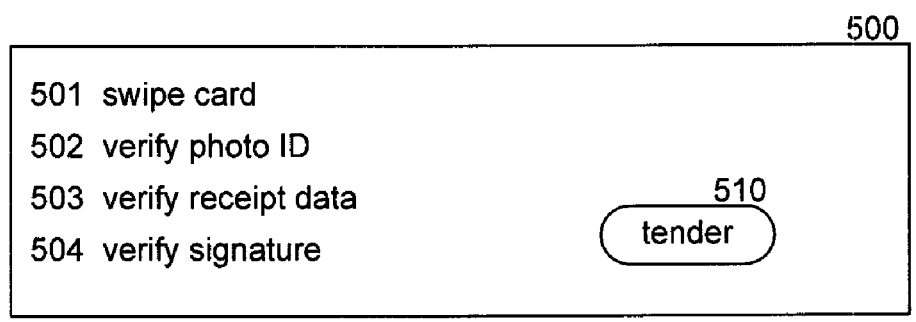

A method and system for providing an extensible framework for a POS application is provided. In some embodiments, a POS application may be extended using a payment format add-in. A payment format add-in provides support for a payment format not included in the payment formats built into the POS application. For example, a POS application that does not support payments via loyalty cards may be extended using a loyalty payment format add-in. Payment format add-ins may be acquired from a variety of sources. For example, a merchant may acquire a payment format add-in from a POS application provider, a third-party add-in provider, or the merchant may develop a payment format add-in. To extend the POS application, the payment format add-in is made available to the POS application by, for example, placing the format add-in in a directory accessible to the POS application.

A payment format add-in may implement, for example, logic for executing a workflow, or a set of workflows, for processing a payment transaction, or a portion of a payment transaction, and logic for displaying an interface used to configure a workflow. When this logic associated with a payment format add-in is to be executed, the POS application can transfer control to the add-in. Using format add-ins, a merchant can support various transactions not supported by the built-in functionality of the POS application. For example, when a user provides an indication to extend the POS application by adding support from a payment format add-in, the POS application searches for and displays an indication of available payment format add-ins. When a user selects a payment format add-in, the POS application transfers control to the payment format add-in, which displays options for configuring a workflow for processing transactions associated with the payment format. Once the user provides the configuration information, the configuration information is stored, for example, in a database table or configuration file, so that the POS application can use the configured workflow, or payment method, to process payment transactions. As another example, when a user of the POS application (e.g., a cashier) attempts to complete a payment transaction, the POS application may provide the user with a set of payment formats from which to choose. If the user selects a payment format add-in, the POS application can transfer control to the add-in. The payment format implemented by an add-in may then perform steps to process the transaction and then return control to the POS application. In this manner, a merchant can extend the functionality of the POS application to support additional payment formats without waiting for the POS application developer to provide a new version of the application.

In some embodiments, the functionality of the POS application may be extended using a workflow add-in. A workflow add-in provides a configurable workflow that can be used to extend a built-in payment format or a payment format add-in. For example, a workflow add-in may provide support for a new type of credit card to a POS application that provides built-in support for credit cards while another workflow add-in provides support for a new type of loyalty payment method to a POS application that supports loyalty payments through a loyalty payment format add-in. A workflow add-in may also include logic for displaying an interface for configuring the workflow add-in. When logic of a workflow add-in is to be executed, workflow add-in information can be obtained from, for example, a table, and control transferred to the workflow add-in. For example, when processing a payment transaction, the POS application or a payment format add-in may display a number of available and configured payment methods. If a user selects a payment method implemented by a workflow add-in, then the POS application or a payment format add-in transfers control to the workflow add-in to process the transaction.

In some embodiments, the POS application can be extended using financial services provider add-ins. A financial services provider add-in provides support for interacting with a financial services provider for which the POS application does not provide built-in support. For example, a POS application with built-in support for TSYS and FDC can be extended to support Global Payments and SiNSYS using financial services provider add-ins. These financial services providers may, for example, use a proprietary encryption scheme or communications protocol to communicate data to and from the financial services provider. A financial services provider add-in may implement the details of these interactions so that different financial services providers can be used to process payment transactions. When the POS application interacts with the financial services provider supported by a financial services provider add-in, the POS application may transfer control, directly or indirectly, to a financial services provider add-in. Financial services provider add-ins may be used by built-in and add-in payment formats and payment methods.

In some embodiments, the POS application provides support for split tender transactions. A split tender transaction allows a person or persons to complete a payment transaction using multiple payment options. For example, a person may wish to purchase an item using the balance remaining on a gift card and cash. As another example, a group of five people may wish to split the check for a meal in five ways, two people paying with credit cards, two people paying with checks, and one person paying with debit card. Some payment formats, such as credit card, cash, and check, are cancelable in that they can be canceled, or voided, after processing without causing an electronic funds transfer. Other payment formats, such as debit card, which cause an electronic funds transfer when the transaction is authorized, are not cancelable. In some cases, when processing a split tender transaction, the initial parts of the payment need to be made using cancelable payments, otherwise the transaction cannot be canceled. For example, if the initial payment is made with a debit card with the intent of paying the remaining balance with a credit card and the credit card payment fails, the funds transferred by the debit card transaction cannot be returned by canceling the transaction. The provided add-ins allow a POS application to determine whether payments made using the add-ins are cancelable. For a split tender transaction, the POS application may deny any non-cancelable partial payment unless the partial payment is the final payment.

Figure 6:
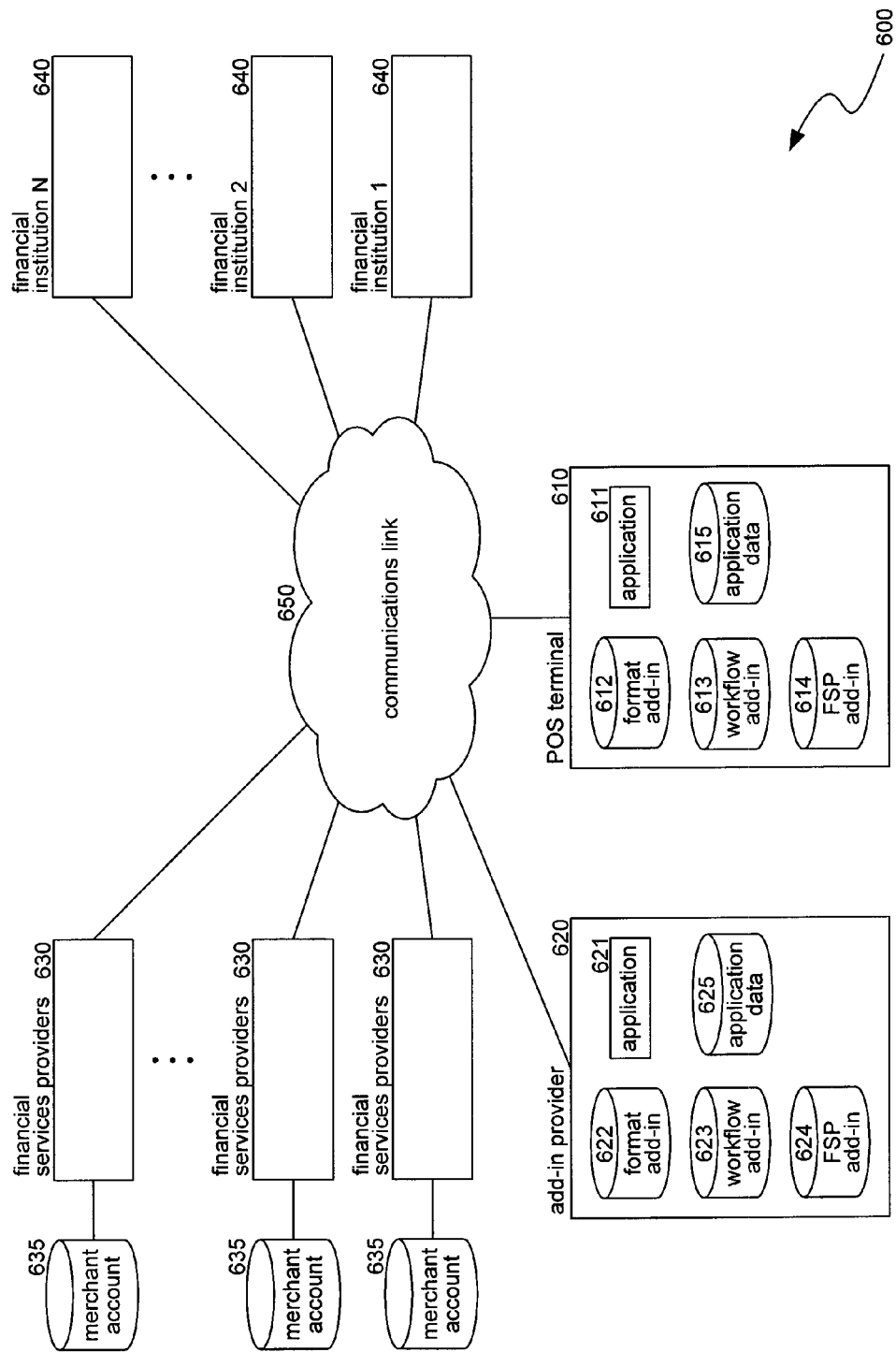
FIG. 6 is a block diagram that illustrates components of the system that uses the extensible framework for a POS application in some embodiments.

FIG. 6 is a block diagram that illustrates components of the system that uses the extensible framework for a POS application in some embodiments. An instance of the POS application may be stored on POS terminal 610. POS terminal 610 is used, for example, by a store employee to checkout customers at a retail location, which may include multiple POS terminals at each of various checkout lanes. POS terminal 610 may be part of an entire POS system that includes additional POS equipment, such as a magnetic stripe reader for processing credit and debit cards or a magnetic ink character recognition device for processing checks. Add-in provider 620 generates add-ins and makes these add-ins available to other users of the POS application. POS terminal 610 provides multiple data stores for storing add-ins for extending the POS application. Data store 613 stores format add-ins, data store 614 stores workflow add-ins, and data store 615 stores financial services provider add-ins. Add-ins may be obtained, for example, from a POS application provider, a third add-in party provider, or can be built by the merchant. As an example, a merchant may download an add-in from a provider's website and install the add-in on a POS terminal. Financial services providers 620 provide financial services to merchants and individuals processing payment transactions. For example, a financial services provider may verify credit card information, such as cardholder name, card number, expiration date and CVV and provide account information such as balance and limits. Financial services providers 620 may obtain this information directly or indirectly from financial institutions 630, such as banks, credit unions, brokerage firms, credit card issuers, and so on. Each merchant may have a merchant account 625 established with each financial services provider 620. The merchant account may store, for example, profile information for the merchant indicating which financial services provided by the financial services provider are accessible by the merchant or information about each of the merchant's transactions involving the financial services provider. The various components of the described system may be connected via communications link 640.

The computing devices on which the extensible framework for a POS application is implemented may include a central processing unit, memory, input devices (e.g., keyboard and pointing devices), output devices (e.g., display devices), and storage devices (e.g., disk drives). The memory and storage devices are computer-readable media that may be encoded with computer-executable instructions that implement the authentication system, which means a computer-readable medium that contains the instructions. In addition, the instructions, data structures, and message structures may be stored or transmitted via a data transmission medium, such as a signal on a communications link and may be encrypted. Various communications links may be used, such as the Internet, a local area network, a wide area network, a point-to-point dial-up connection, a cell phone network, and so on.

Embodiments of the extensible framework may be implemented in and used with various operating environments that include personal computers, server computers, handheld or laptop devices, multiprocessor systems, microprocessor-based systems, programmable consumer electronics, digital cameras, network PCs, minicomputers, mainframe computers, computing environments that include any of the above systems or devices, and so on.

The extensible framework may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 7:
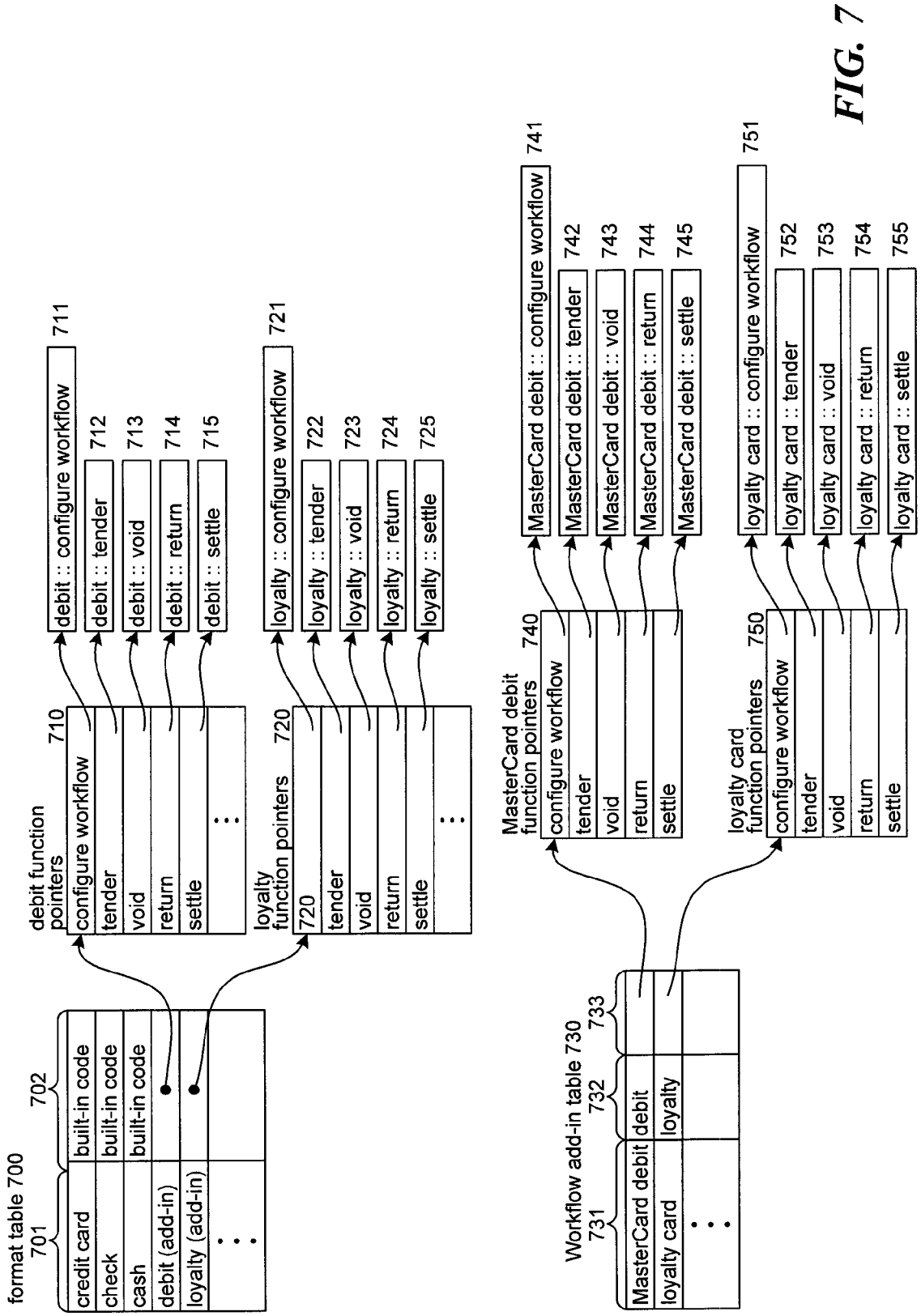
FIG. 7 is a block diagram illustrating a format table and a workflow add-in table used by the POS application in some embodiments.

FIG. 7 is a block diagram illustrating a format table and a workflow add-in table used by the POS application in some embodiments. Format table 710 stores information about each payment format available to the POS application for processing payment transactions. Column 701 stores a name for each payment format; in this example, format table 700 includes a credit card payment format, a check payment format, a cash payment format, a debit payment format, and a loyalty payment format. For payment formats that are built into the POS application, column 702 stores the code necessary for configuring and processing payment transactions using each payment format. For payment format add-ins, column 702 stores the address of the first element of an array of function pointers, each function pointer pointing to a location of a function used by the payment format add-in. For example, format table 700 stores the address of the first element of a set of function pointers 710 in association with a debit payment format add-in and the address of the first element of a set of function pointers 720 in association with a loyalty payment format add-in. Each set of function pointers 710 and 720 stores pointers to functions 711-715 and 721-725, respectively. When the POS application transfers control to a payment format add-in in this example, the POS application obtains a pointer to the relevant function via the payment format table and invokes the function. Display template functions 711 and 721 provide the logic necessary for displaying a template for configuring each payment format add-in, receiving configuration information from a user, and storing the configuration information. Tender functions 712 and 722 provide the logic necessary for processing a tender payment transaction at the time of checkout. Void functions 713 and 723 provide the logic necessary for voiding a payment transaction, which undoes the payment transaction. Return functions 714 and 724 provide the logic necessary for processing a return transaction, such as when a customer wishes to return an item. The return payment function may generate another payment transaction using a negative dollar amount. Settle functions 715 and 725 provide the logic necessary for settling electronic payment transactions at, for example, the end of each business day. Each add-in can define whether it settles data at the time of a transaction or at a time subsequent to the transaction. At the time of a transaction, funds in the consumer's account may be held as unavailable but not transferred from the account until the transaction is settled. Some merchants may settle all transactions in a batch at the end of the day.

Workflow add-in table 730 stores information about each workflow available to the POS application for processing payment transactions. Column 731 stores a name for each workflow add-in, in this example format table 730 includes a MasterCard debit workflow add-in and a loyalty card workflow add-in. Column 732 stores the name of the payment format associated with the workflow add-in and column 733 stores the address of the first element of an array of function pointers pointing to locations of functions associated with the workflow add-in. Function pointer sets 740 and 750 stores pointers to functions 741-745 and 751-755, respectively. When the POS application or a format add-in transfers control to a workflow add-in in this example, the pointer to the relevant function is obtained via the workflow add-in table and the function is invoked. The functions associated with the workflow add-ins correspond to the functions associated with payment format add-ins, as described above. One skilled in the art will appreciate that while FIG. 7 provides an illustration that is easily comprehensible by a human reader, the actual information may be stored using different data structures and data organizations.

Figure 8:
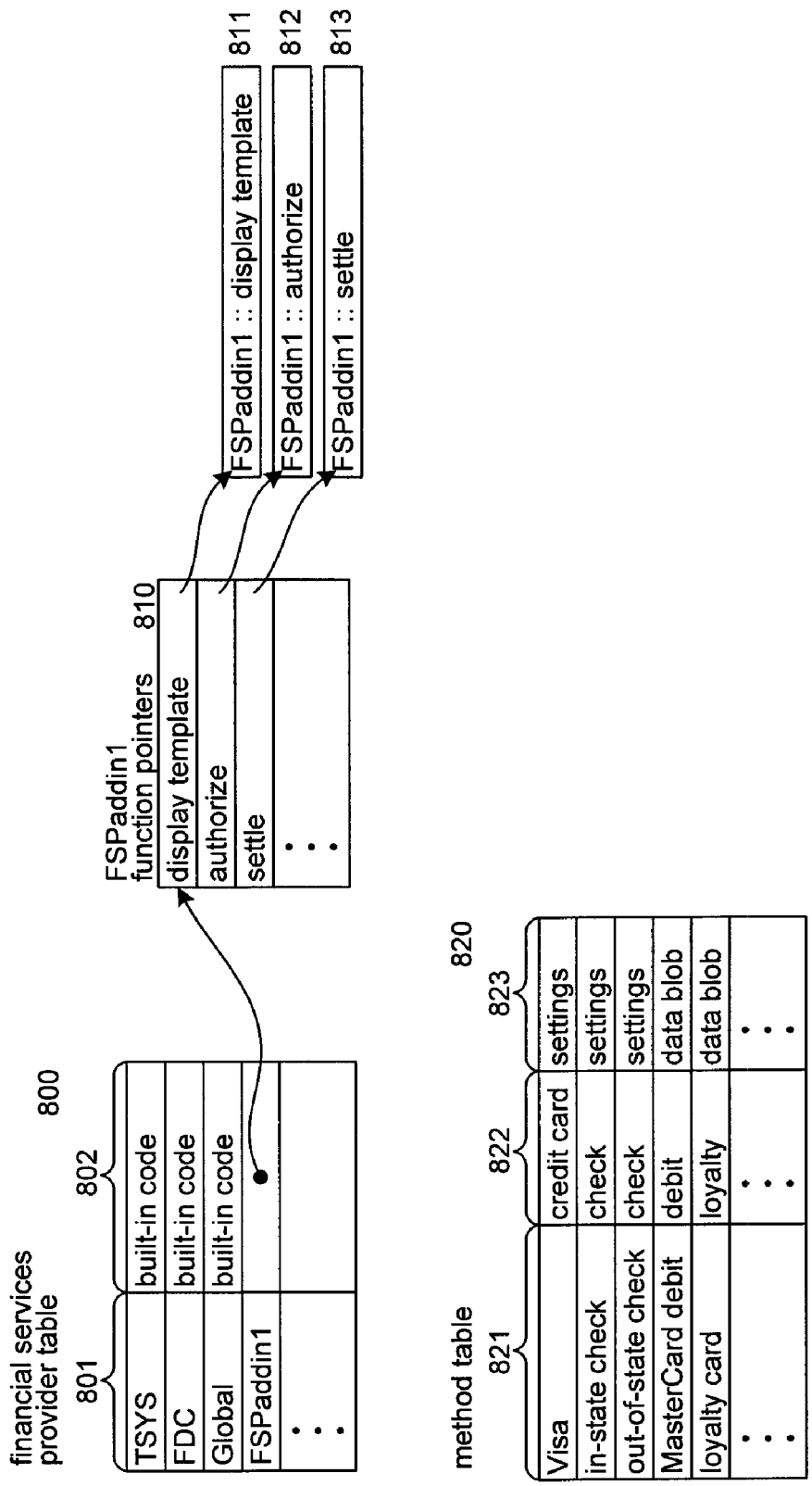
FIG. 8 is a block diagram illustrating a financial services provider table used by the POS application in some embodiments.

FIG. 8 is a block diagram illustrating a financial services provider table used by the POS application in some embodiments. Financial services provider table 800 stores information about financial services providers. The POS application uses financial services provider table 800 to determine which financial services providers are available. Column 801 stores names of each available financial services provider, such as TSYS, FDC, Global, and FSPAddin1. For built-in financial services providers TSYS, FDC, and Global, column 802 stores built-in code of the POS application for interacting with the associated financial services providers. For financial services provider add-ins, column 802 stores an address to the first element of an array of function pointers. For example, in association with FSPAddin1, financial services provider table 800 stores an address of a set of function pointers 810 that point to functions 811, 812, and 813. Display template function 811 provides the logic necessary for displaying a template for receiving configuration information from a user, and storing the configuration information for FSPaddin1. Authorize function 812 provides the logic necessary for querying a financial services provider for authorization to process a payment transaction. Settle function 813 provides the logic necessary for settling payment transactions through a financial services provider.

Payment method table 820 stores information about each of the payment methods available to the POS application. Column 821 stores a name for each of the payment methods and column 822 stores the name of the payment format associated with the payment method. For payment methods associated with built-in workflows, column 823 stores the settings for the configured workflow. For payment methods associated with an add-in, column 823 stores a data blob containing information the associated add-in or add-ins may use when processing payment transactions using a particular method. For example, a data blob may include an indication of a workflow add-in associated with the payment method and workflow settings. When a user invokes a payment method, the appropriate add-in uses the data blob while processing a payment transaction. One skilled in the art will recognize that while FIG. 8 provides an illustration that is easily comprehensible by a human reader, the actual information may be stored using different data structures and data organizations.

Figure 9:
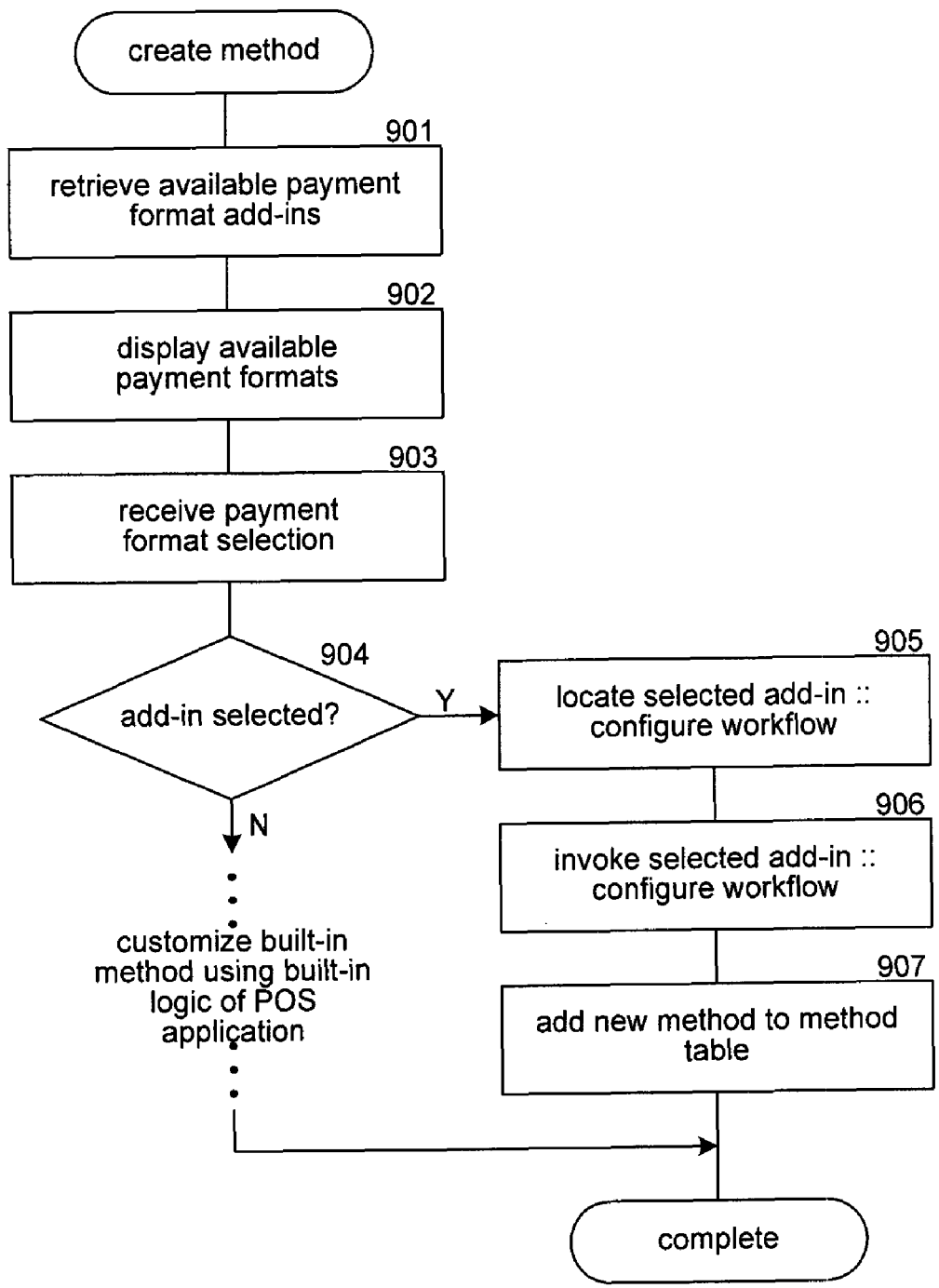
FIG. 9 is a flow diagram that illustrates the processing of a create method component of the POS application in some embodiments.

FIG. 9 is a flow diagram that illustrates the processing of a create payment method component of the POS application in some embodiments. In block 901, the component retrieves available payment format add-ins. The component may locate available format add-ins by scanning a directory structure for available add-ins or by accessing a format table. In block 902, the component displays the available payment formats, which includes all built-in payment formats and all payment format add-ins. In block 903, the component receives a selection of a payment format to be associated with the new payment method. For example, a user may type in the name of a payment format or click on a payment format. In decision block 904, if the selected payment format is not a payment format add-in, then the built-in logic of the POS application for customizing a built-in payment executes, else the component continues to block 905. In block 905, the component locates a define workflow function of the selected payment format add-in. The component may locate the define workflow function by identifying the selected payment format in a format table and using the address information stored in the format table and in association with the format table. In block 906, the component transfers control to the define workflow function of the selected payment format. The define workflow function executes the logic of the payment format add-in for generating a workflow for processing payment transactions. For example, the define workflow function may display a template with a number of user-configurable options, such as a maximum dollar amount for a single transaction, whether or not a photo ID and/or signature is required for a transaction, or the preferred financial services provider for processing payment transactions using the new payment method. As another example, the payment format add-in may display a list of workflow add-ins associated with the payment format and transfer control to a selected workflow add-in by invoking a configure workflow function of the selected workflow add-in. In block 907, the component stores a data blob containing instructions for the newly defined workflow in the method table using a name provided by the user. The processing of the component then completes.

FIG. 10 is a display page illustrating a dialog generated by the POS application for selecting a payment format when configuring a payment method in some embodiments. Display page 1000 includes drop-down list 1020 which provides a list of available add-ins. In this example, the dropdown list includes an entry for each built-in payment format and an entry for "other." When a user selects "other," the user may be presented with a list of payment format add-ins, such as list 1025. Alternatively, drop-down list 1020 may include all available payment formats. Drop-down list 1030 provides a list of currency options that a user may select to associate with a particular payment method. A user may enter a maximum amount for any payment transaction processed using the new payment method in text box 1040. Once the user has configured the options provided on display page 1000, the user may click "continue" button 1050. If the user has selected a built-in payment format, clicking "continue" button 1050 causes the POS application to process the customization of the built-in payment format. If the user has selected a payment format add-in, clicking "continue" button 1050 causes the POS application to transfer control to the add-in.

FIG. 11 is a display page illustrating a dialog generated by a payment format add-in for selecting a workflow when configuring a payment method in some embodiments. Display page 1100 includes drop-down list 1110, which includes a list of all available workflow add-ins associated with a selected payment format, in this example a debit payment format add-in. Once the user has selected a workflow add-in, the user may click "continue" button 1120, causing the payment format add-in to transfer control to the selected workflow add-in.

FIG. 12 is a display page illustrating a dialog generated by a workflow add-in for configuring a workflow for processing payment transactions in some embodiments. In this example, the user has selected to configure a payment method associated with a debit payment format add-in. Display page 1200 includes text box 1205 where a user can set the name of the payment method. Drop-down list 1210 provides a list of financial services providers from which a user can select a financial services provider to associate with the method. Upon selection of a financial services provider associated with a financial services provider add-in, the payment format add-in may transfer control to the financial services provider add-in for configuration. Display page 1200 also includes options 1220-1226, which allow a user to configure a workflow for processing a payment transaction. In this example, the user has configured the payment method to acquire a photo ID, a CVV, and a signature, and to print a receipt for each payment transaction. When the user clicks "done" button 1230, the workflow add-in may transfer control to the POS application or a format add-in, which may store the newly created method in the method table. Alternatively, clicking "done" button 1230 may cause a configuration dialog for the selected financial services provider to be displayed by the POS application or a financial services provider add-in before transferring control to the POS application.

Figure 13A:
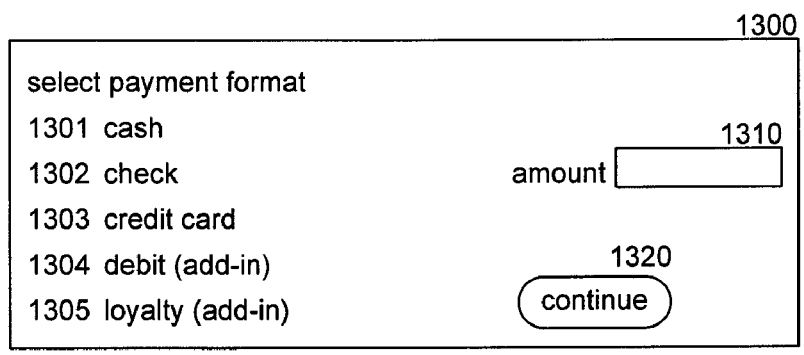
FIG. 13a is a display page illustrating a user interface dialog for selecting a payment format at the time of a tender payment transaction in some embodiments.

FIG. 13a is a display page illustrating a user interface dialog for selecting a payment format at the time of a tender payment transaction in some embodiments. Display page 1300 includes a list of available payment formats, 1301-1305. Display page 1300 may include an indication of which payment formats are supported by payment format add-ins and which are built into the POS application. Display page 1300 also includes a text box 1310 where a user can enter a dollar amount associated with the payment transaction. When the user has selected a payment format and entered a dollar amount, the user may click "continue" button 1320. If the selected payment format is a built-in payment format, then processing by the POS application continues, else control is transferred to the selected payment format add-in. If the payment format add-in requires any payment workflow processing, the payment format add-in may instruct the user to perform certain actions at this time. For example, a debit card payment format add-in may instruct the user to swipe a debit card or enter a debit card number before transferring control to a workflow add-in.

Figure 13B:
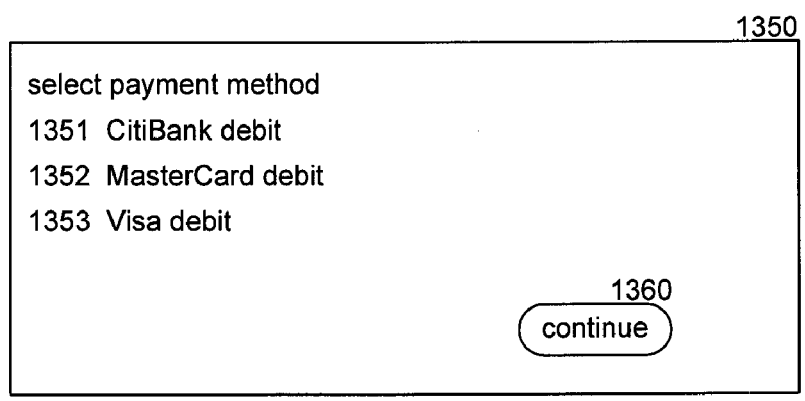
FIG. 13b is a display page illustrating a user interface dialog for selecting a payment method associated with a selected payment format at the time of a tender payment transaction in some embodiments.

FIG. 13b is a display page illustrating a user interface dialog for selecting a payment method associated with a selected payment format at the time of a tender payment transaction in some embodiments. In this example, the selected payment format is a debit card payment format. Display page 1350 includes a list of available payment methods 1351-1353 associated with the selected payment format. Display page 1350 may also display any information collected during the tender payment transaction, for example, the dollar amount associated with the transaction.

Figure 14:
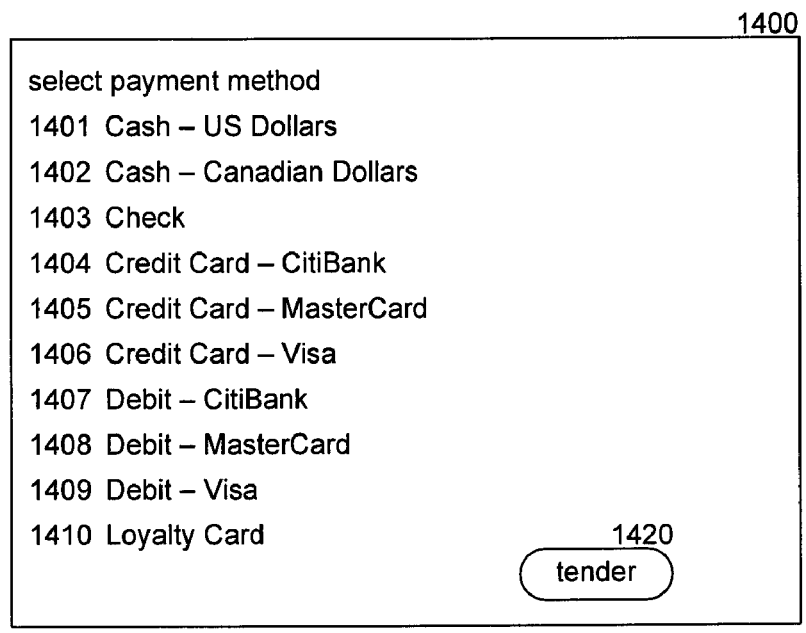
FIG. 14 is a display page illustrating a user interface dialog for selecting a payment method at the time of a tender payment transaction in some embodiments.

FIG. 14 is a display page illustrating a user interface dialog for selecting a payment method at the time of a tender payment transaction in some embodiments. Display page 1400 includes a list of all available payment methods 1401-1410, regardless of the payment format. From this list, a user may select the appropriate payment method in a single step without first selecting a payment format. If the selected payment method corresponds to a built-in payment format, then processing by the POS application continues, else if the payment method corresponds to a payment format from a payment format add-in, then control is transferred to the payment format add-in. If the payment format add-in requires any payment workflow processing, the payment format add-in may instruct the user to perform appropriate actions at this time.

Figure 15:
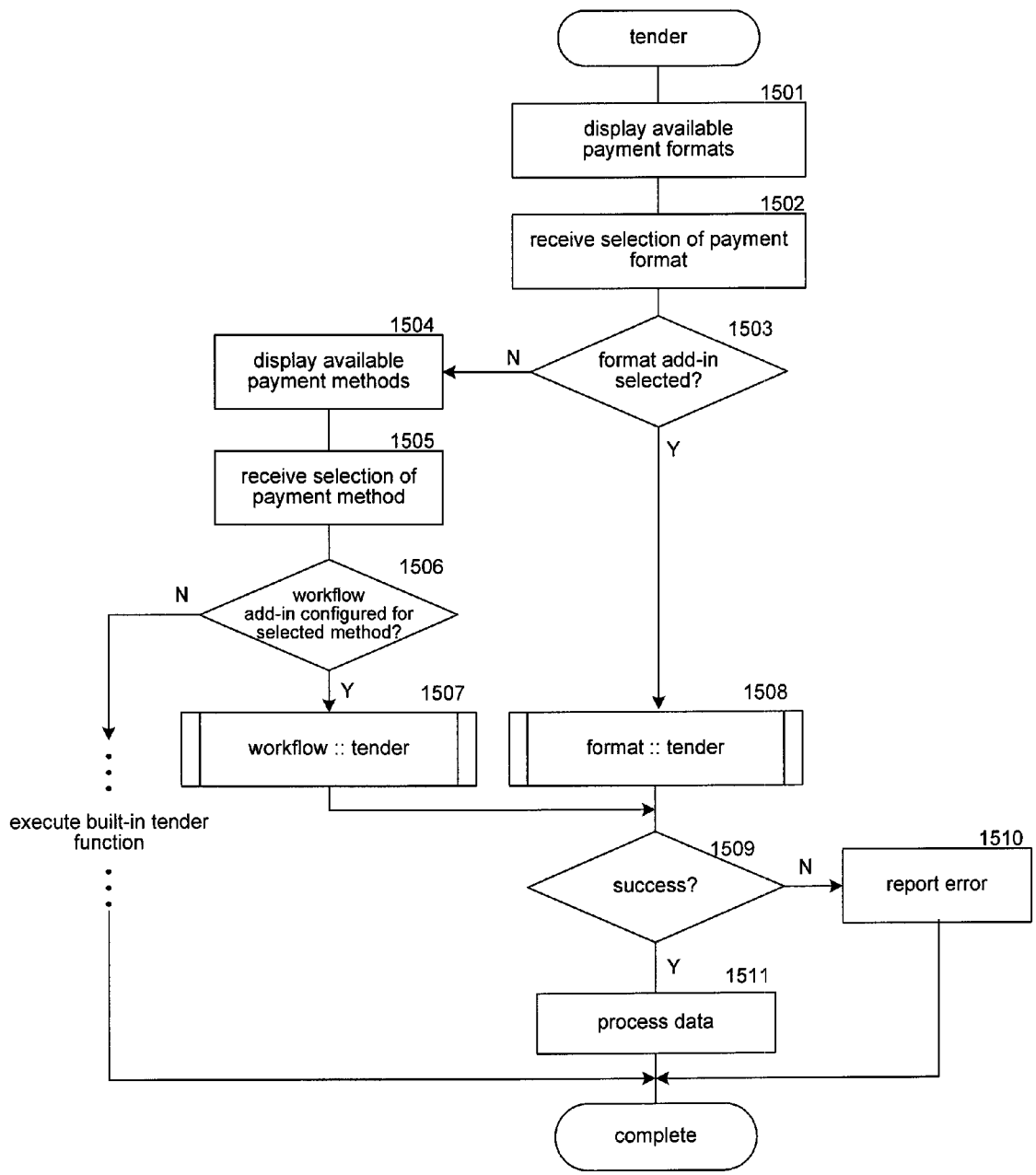
FIG. 15 is a flow diagram that illustrates the processing of a tender function component of the POS application in some embodiments.

FIG. 15 is a flow diagram that illustrates the processing of a tender function component of the POS application in some embodiments. Although this example relates specifically to a tender payment transaction, similar logic could be executed to process various types of payment transactions, such as a return transaction, a void transaction, and so on. The tender function is executed at the time of sale to process a tender payment transaction. In block 1501, the component displays available payment formats to a user (e.g., a cashier), including built-in payment formats and payment format add-ins. In block 1502, the component receives a selection of a payment format. In block 1503, if the selected payment format is a built-in payment format, then the component continues at block 1504, else the component continues to block 1508. In block 1508, the component invokes a tender function of the selected payment format add-in. The component, for example, may locate the tender function of the payment format add-in using the payment format table illustrated in FIG. 7. In block 1504, the component displays to the user available payment methods associated with the selected payment format. In block 1505, the component receives a selection of a payment method. In block 1506, if a workflow add-in is not configured for the selected payment method, then the built-in code of the POS application is used to process the payment transaction, else the component invokes a tender function of the associated workflow add-in. If the component invoked a tender function of an add-in, processing continues to block 1509, where the component determines whether the tender function was successful. In block 1509, if the tender function of the payment format add-in or workflow add-in returns successfully, then the component continues to block 1511, else, in block 1510, the component reports an error message. In block 1511, the component processes any data received from the payment format add-in tender function or the workflow add-in tender function. For example, the POS application may record an indication of completed transactions and information about any financial services provider used to in processing a transaction. The processing of the component then completes.

Figure 16:
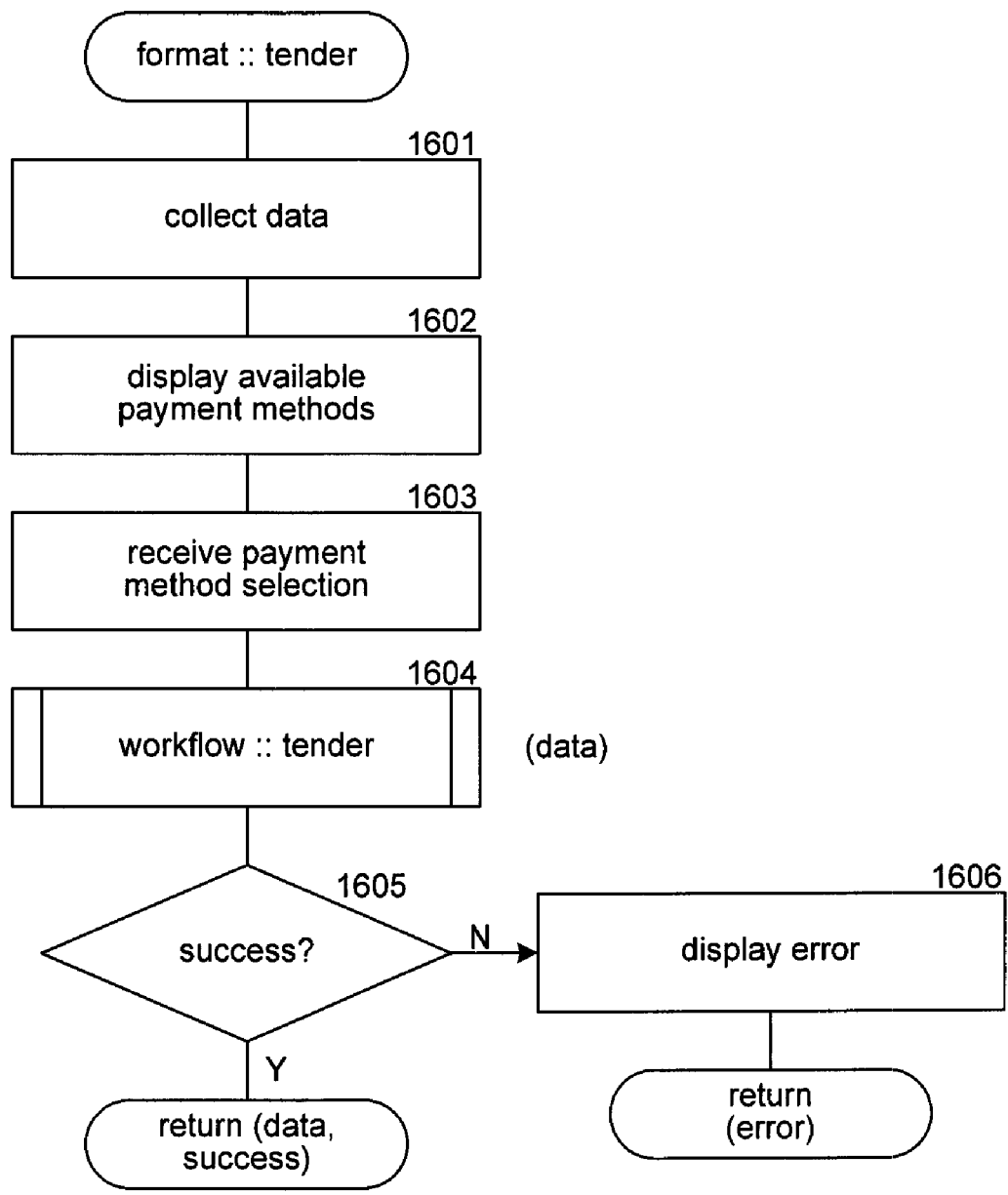
FIG. 16 is a flow diagram illustrating the processing of a tender function component of a payment format add-in in some embodiments.

FIG. 16 is a flow diagram illustrating the processing of a tender function component of a payment format add-in in some embodiments. In this example, the payment format add-in is a debit card payment format add-in and the tender function is invoked when a user selects the debit card payment format add-in to complete a tender payment transaction. In block 1601, the component collects data for completing the tender payment transaction. For example, the debit card payment format add-in may receive card information and a PIN associated with the card. These instructions are implemented as part of the debit card payment format add-in and are executed each time a payment method associated with the debit card payment add-in is used to process a tender payment transaction. One skilled in the art will recognize that the instructions for collecting data could be implemented as part of each payment method associated with the payment format add-in. In block 1602, the component displays available payment methods associated with the payment format add-in. In block 1603, the component receives a selection of a payment method. In block 1604, the component invokes a tender function of a workflow add-in associated with the selected payment method, passing collected data, such as a debit card number and a PIN. In decision block 1605, if the tender function of the workflow add-in completes successfully, then the component returns any collected data to the POS application and an indication of the success, else in block 1606 the component displays an error message and returns an indication of the error.

Figure 17:
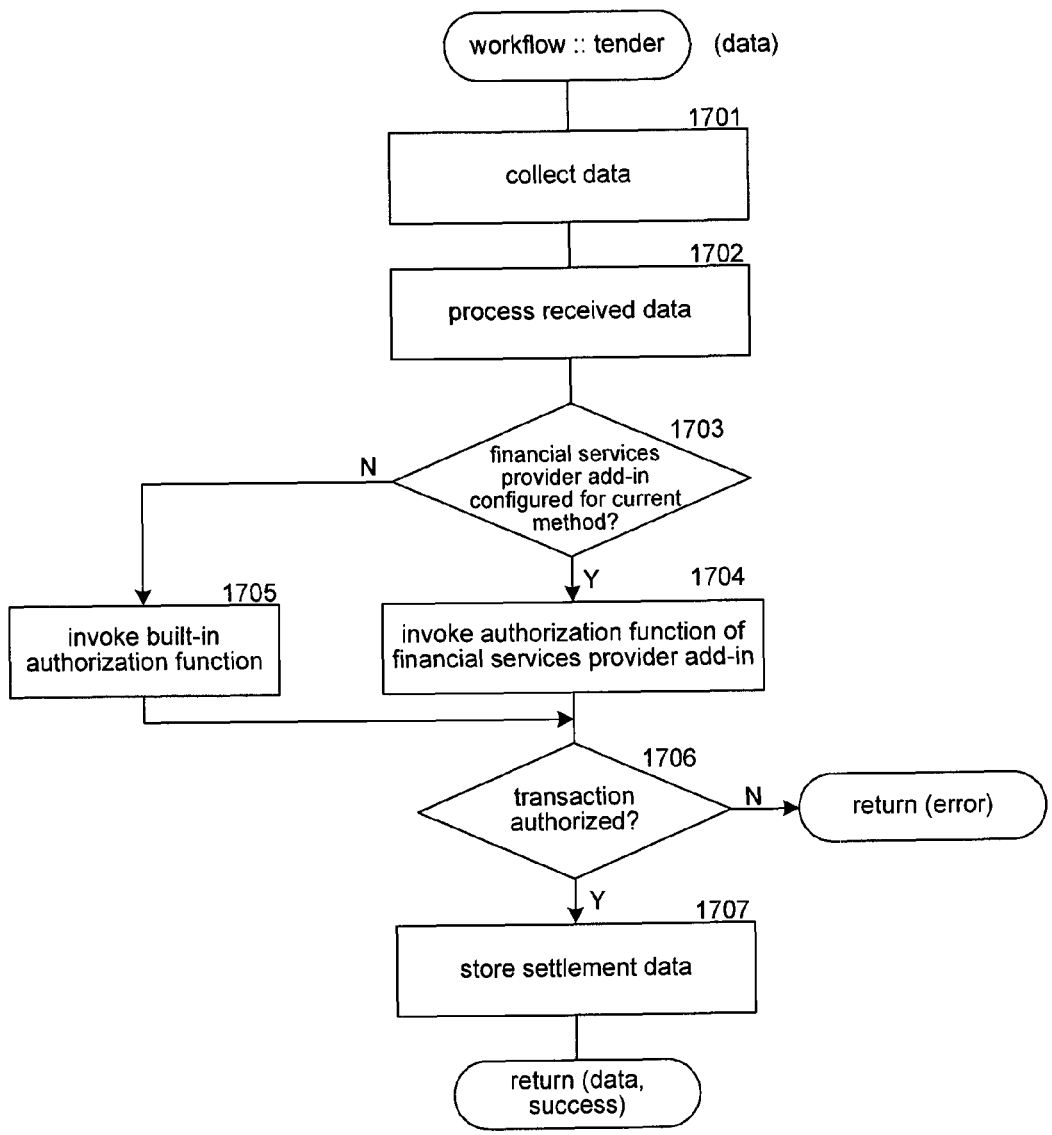
FIG. 17 is a flow diagram illustrating the processing of a tender function component of a workflow add-in in some embodiments.

FIG. 17 is a flow diagram illustrating the processing of a tender function component of a workflow add-in in some embodiments. In this example, the payment workflow is a debit card workflow add-in and the tender function is invoked when a user selects a payment method associated with the workflow add-in to complete a tender payment transaction. In block 1701, the component collects data for processing the tender payment transaction. For example, a workflow add-in may allow the customer to swipe a debit card on a pin pad device, enter the debit card PIN number and collect the information from the hardware. In block 1702, the component processes any received data, such as data collected by the component or data passed to the component. For example, the component may perform a check digit algorithm to validate the debit card number. In block 1703, if the current method is associated with a financial services provider add-in, the processing continues to block 1704 where the component invokes an authorization function of the financial services provider add-in, else processing continues to block 1705. In block 1705, the component invokes a built-in authorization function of the POS application, which may, for example, cause the POS application to communicate with a financial services provider to authorize the transaction. In decision block 1706, if the financial services provider does not authorize the transaction, then the component returns an error, else the component continues to block 1707. In block 1707, the component stores data for settling the tender payment transaction. The component then returns any collected data and an indication of success.

Although the exemplary transaction is a tender payment transaction, one skilled in the art will recognize that add-ins can be employed to perform any type of payment transaction. Certain payment formats, such as credit card payments, may require a separate settlement process at the end of each business day besides the payment authorization at the time of tendering payment in order to finalize a transaction. A payment format add-in can be employed to perform such operations. Similarly, if a financial services provider add-in is necessary to settle a transaction, a method of the financial services provider add-in can be invoked for transaction settlement as well. One skilled in the art will recognize that add-ins can be used in the processing of any type of payment transaction.

Figure 18A:
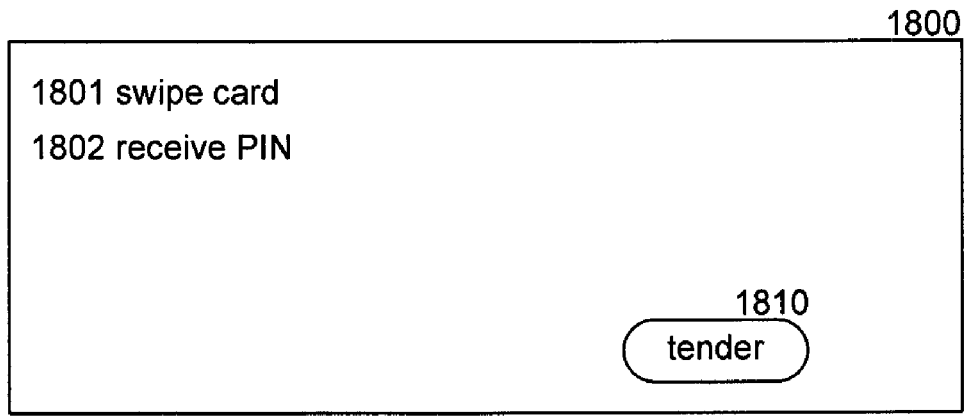
FIG. 18a is a display page illustrating a user interface dialog generated by the POS application displaying the steps that a user is to complete during a tender payment transaction supported by the built-in logic of the POS application in some embodiments.

FIG. 18a is a display page illustrating a user interface dialog generated by the POS application displaying the steps that a user is to complete during a tender payment transaction supported by the built-in logic of the POS application in some embodiments. In this example, the payment method requires that the user perform steps 1801-1802, which include swiping a debit card and receiving a PIN. Display page 1800 may also display additional information for the user, such as a reminder to provide the consumer with a pinpad for entering a PIN if a PIN has not been received. The user may be required to check a box next to each step 1801-1802 prior to completing the transaction. Once the user has completed these steps, the user may click "tender" button 1810. The POS application then uses the collected information to process the transaction, which may include sending information to a financial services provider for payment authorization.

Figure 18B:
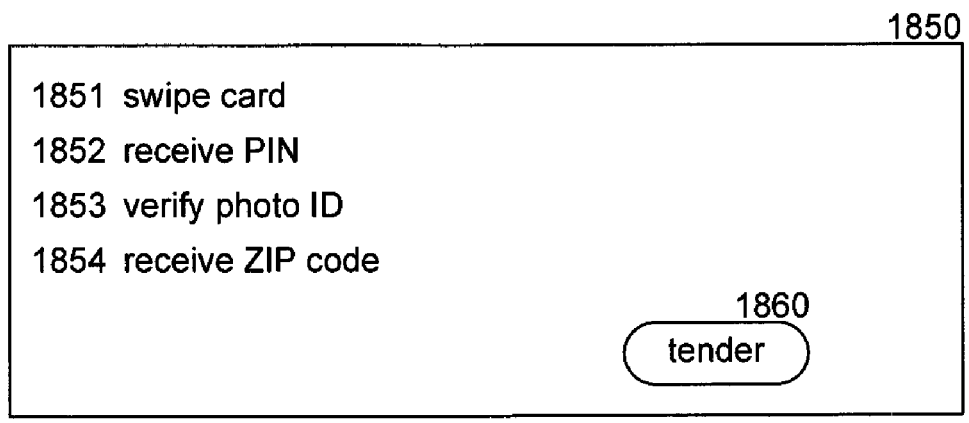
FIG. 18b is a display page illustrating a user interface dialog generated by a workflow add-in displaying the steps that a user is to complete during a tender payment transaction using a selected payment method in some embodiments.

In some cases, the workflow for a payment method may need to be customized. FIG. 18b is a display page illustrating a user interface dialog generated by a workflow add-in displaying the steps that a user is to complete during a tender payment transaction using a selected payment method in some embodiments. In this example, the payment method requires that the user perform steps 1851-1854, which include swiping a debit card, receiving a PIN, verifying photo identification, and receiving a ZIP code. Display page 1850 may also display additional information for the user, such as types of photo identification permissible for verification purposes, or a reminder to provide the consumer with a pinpad for entering a PIN if a PIN has not been received. The user may be required to check a box next to each step 1851-1854 prior to completing the transaction. Once the user has completed these steps, the user may click "tender" button 1860. The workflow add-in then uses the collected information to process the transaction, which may include sending information to a financial services provider and providing an indication to the associated payment format add-in or to the POS application of whether the tender payment transaction succeeded or failed.

Figure 19:
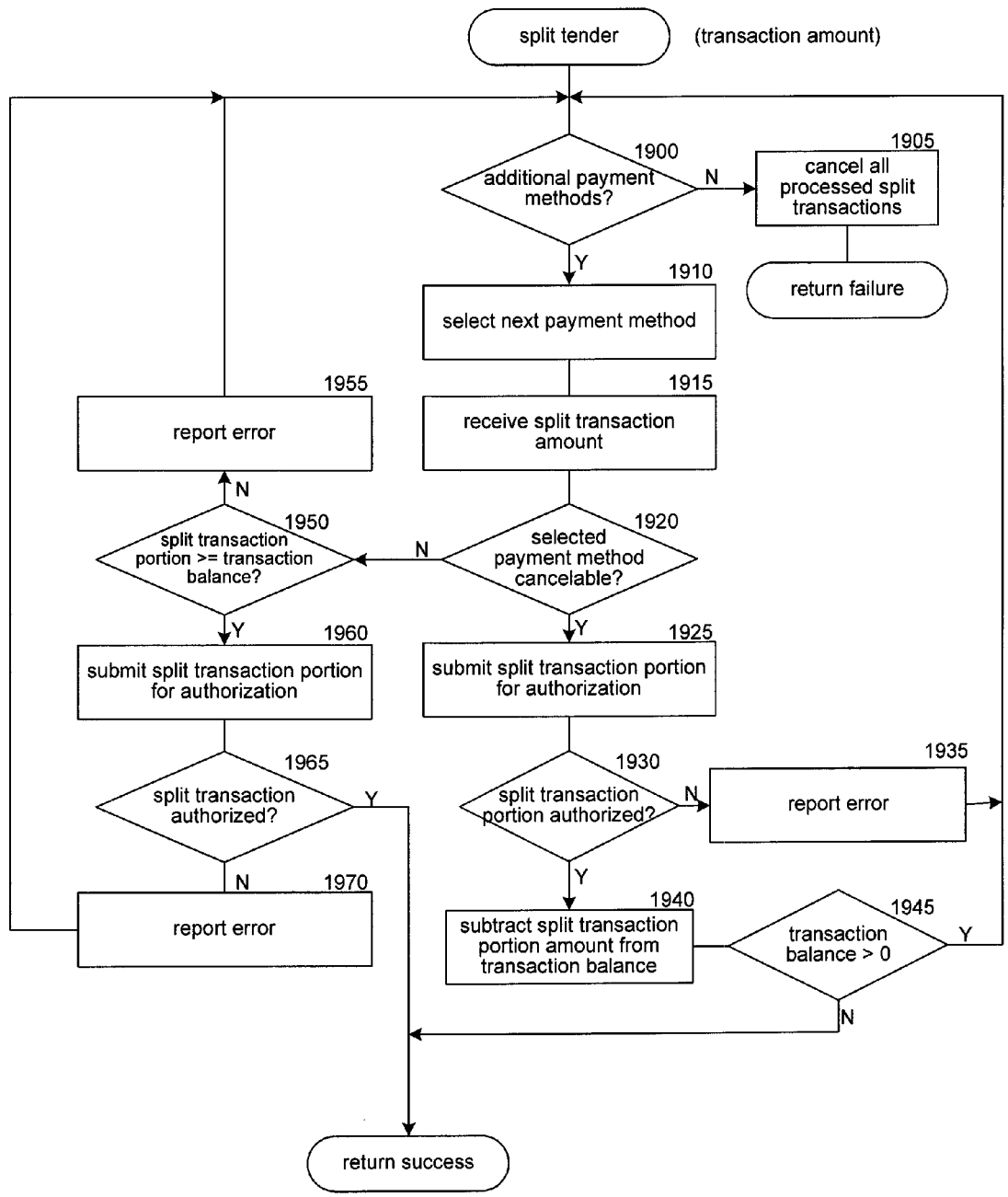
FIG. 19 is a flow diagram illustrating the processing of a split tender component of a POS application in some embodiments.

FIG. 19 is a flow diagram illustrating the processing of a split tender component of a POS application in some embodiments. The component is invoked when a tender payment transaction is to be satisfied using multiple payment options. For example, three individuals may wish to split a check for a meal three ways, two parties paying with credit cards and the other party paying with a debit card. The component is passed the total amount for the transaction. In block 1900, if there are no additional payment options to select, then in block 1905 all of the transactions that have been processed thus far for the associated transaction are canceled, else in block 1910 a payment method is selected. In block 1915, the component receives a split transaction amount to be associated with the selected method (i.e., the amount to be paid by one of the parties associated with the split tender transaction). In block 1920, if the selected payment method is cancelable, which can be determined, for example, by querying a payment add-in or the built-in logic the POS application, then the component continues to block 1925, else the component continues to block 1950. In block 1925, the component submits the portion of the split transaction associated with the selected method for authorization. For example, the split transaction amount along with credit card information may be submitted to a financial services provider. In step 1930, if the split transaction amount was not authorized using the selected payment method, then in block 1935 the component reports an error and loops back to step 1900, else in block 1940 the component subtracts the split transaction portion from the transaction balance. In block 1945, if the transaction balance is greater than zero, then the component loops to block 1900 to continue processing the payment transaction, else processing of the component completes. In block 1950, if the split transaction portion is less than the transaction balance, then in block 1955, the component reports an error, else in block 1960 the component submits the portion of the split transaction associated with the selected method for authorization. In block 1965, if the split transaction amount was not authorized using the selected payment method, then in block 1970 the component reports an error and loops to block 1900 to continue processing the payment transaction, else processing of the component completes.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A method in a computer system having a memory and a processor for extending a point of sale application, the method comprising:

providing a point of sale application having a user interface and a set of built-in payment methods, wherein each built-in payment method is supported by built-in code of the point of sale application;

downloading a payment format add-in, wherein the payment format add-in provides support for a payment format not supported by the built-in code of the point of sale application and is associated with at least one workflow not supported by the built-in code of the point of sale application, wherein the at least one workflow not supported by the built-in code of the point of sale application is associated with a configurable first set of steps for processing payment transactions that can be performed while processing a payment transaction between a merchant and a customer;

storing the downloaded payment format add-in on the computer system;

with a processor, establishing a payment method not supported by the built-in code of the point of sale application at least in part by configuring the first set of steps associated with the at least one workflow not supported by the built-in code of the point of sale application and associated with the payment format add-in, wherein the payment format add-in provides support for a payment format not supported by the built-in code of the point of sale application; and storing an indication of the established payment method not supported by the built-in code of the point of sale application so that when the established payment method not supported by the built-in code of the point of sale application is selected when processing a payment transaction, the point of sale application transfers control to the payment format add-in to execute the established payment method and authorize the payment transaction.

2. The method of claim 1 further comprising:

providing a financial services provider add-in for a payment method, the financial services provider add-in providing support for interacting with a financial services provider; and associating the financial services provider with the established payment method not supported by the built-in code of the point of sale application so that when the established payment method not supported by the built-in code of the point of sale application is selected, control is transferred to the financial services provider add-in to process.

3. The method of claim 1 wherein the payment format add-in provides a tender function for controlling the tendering of a payment and wherein the tender function invokes a tender function of a workflow add-in specified when the payment method was established.

4. The method of claim 1 wherein the payment format add-in provides a define function for configuring the configurable set of steps associated with a workflow.

5. The method of claim 4 wherein the configuring of workflow options includes:
selecting of a workflow add-in; and
invoking a define function of the workflow add-in.

6. The method of claim 1 wherein the payment format add-in is associated with a first workflow and a second workflow, wherein the first workflow is associated with a first configurable set of steps and wherein the second workflow is associated with a second configurable set of steps, wherein the first configurable set of steps is different from the second configurable set of steps.

7. The method of claim 6, further comprising:
establishing a first payment method at least in part by configuring the first configurable set of steps; and
establishing a second payment method at least in part by configuring the second configurable set of steps.

8. The method of claim 6, further comprising:
while processing a payment transaction between a merchant and a customer,
displaying an indication of the first payment method and an indication of the second payment method; and
receiving a selection of a payment method.

9. The method of claim 6, further comprising:
receiving from a user a selection of a workflow associated with the payment format add-in; and
in response to receiving the selection, displaying an indication of the configurable set of steps associated with the selected workflow.

10. The method of claim 1 wherein the point of sale application performs at least a first portion of a transaction between a merchant and a customer before transferring control to the payment format add-in and the payment format add-in performs at least a second portion of the transaction between the merchant and the customer before returning control to the point of sale application.

11. The method of claim 1 wherein the payment format add-in is developed by a user of the point of sale application.

12. A computer-readable medium storing instructions that, when executed by a computer having a memory and a processor, cause the computer to perform a method for extending a point of sale application, the method comprising:
receiving a payment format add-in, wherein the payment format add-in provides support for a payment format not supported by built-in code of the point of sale application and is associated with a first workflow associated with a first configurable set of steps for processing payment transactions, wherein one of the first configurable set of steps is performed while executing a transaction between a merchant and a customer, wherein the first workflow is not supported by the built-in code of the point of sale application; and
establishing a first payment method not supported by the built-in code of the point of sale application by configuring the first configurable set of steps associated with the first workflow,
so that when the established first payment method not supported by the built-in code of the point of sale application is selected when processing a payment transaction, the point of sale application transfers control to the payment format add-in to execute the first payment method not supported by the built-in code of the point of sale application.

13. The computer-readable medium of claim 12, further comprising:
establishing a second payment method not supported by the built-in code of the point of sale application by configuring the first configurable set of steps associated with the first workflow, wherein the second payment method not supported by the built-in code of the point of sale application is different from the first payment method.

14. The computer-readable medium of claim 12 wherein the payment format add-in is associated with a second workflow associated with a second configurable set of steps for processing payment transactions, wherein the second configurable set of steps is different from the first configurable set of steps.

15. The computer-readable medium of claim 14, further comprising:
establishing a second payment method not supported by the built-in code of the point of sale application by configuring the second configurable set of steps associated with the second workflow; and
establishing a third payment method not supported by the built-in code of the point of sale application by configuring the second configurable set of steps associated with the second workflow, wherein the configured set of steps associated with the third payment format is different from the configured set of steps associated with the second payment format so that the third payment method not supported by the built-in code of the point of sale application is different from the second payment method not supported by the built-in code of the point of sale application.

16. The computer-readable medium of claim 15, further comprising:
during execution of a payment transaction between a merchant and a customer,
displaying an indication of the first payment method not supported by the built-in code of the point of sale application,
displaying an indication of the second payment method not supported by the built-in code of the point of sale application,
displaying an indication of the third payment method not supported by the built-in code of the point of sale application, and
receiving a selection of a payment method not supported by the built-in code of the point of sale application.

17. A computing device having a memory and a processor for extending a point of sale application, the computing device comprising:
a component that stores a payment format add-in, the payment format add-in providing support for a payment format not supported by built-in code of the point of sale application and having an associated first workflow not supported by the built-in code of the point of sale application defining a first configurable set of steps for processing payment transactions and a second workflow not supported by the built-in code of the point of sale application defining a second configurable set of steps for processing payment transactions, wherein the first configurable set of steps is different from the second configurable set of steps;
a component that displays a first interface that includes an indication of each of the first configurable set of steps, wherein the first interface allows a user to define a payment method by configuring the first configurable set of steps;

a component that receives an indication of a first configuration of the first configurable set of steps from the first interface;

a component that stores the first configuration as a first defined payment method not supported by the built-in code of the point of sale application;

a component that displays a second interface that includes an indication of each of the second configurable set of steps, wherein the second interface allows a user to define a payment method by configuring the second configurable set of steps;

a component that receives an indication of a second configuration of the second configurable set of steps from the second interface;

a component that stores the second configuration as a second defined payment method not supported by the built-in code of the point of sale application; and a component that, when a defined payment method not supported by the built-in code of the point of sale application is selected while processing a payment transaction, transfers control from the point of sale application to the payment format add-in to execute the configured set of steps of the selected defined payment method not supported by the built-in code of the point of sale application.

18. The computing device of claim 17, further comprising:
a component that receives an indication of a third configuration of the first configurable set of steps from the first interface, wherein the third configuration is different from the first configuration; and
a component that stores the third configuration of the first configurable set of steps as a third defined payment method.

19. The computing device of claim 18, further comprising:
a component that receives an indication of a fourth configuration of the second configurable set of steps from the second interface; and
a component that stores the fourth configuration as a fourth defined payment method.

20. The computing device of claim 19, further comprising:
a component that, during execution of a payment transaction between a merchant and a customer,
displays an indication of the first defined payment method,
displays an indication of the second defined payment method,
displays an indication of the third defined payment method,
displays an indication of the fourth defined payment method, and
receives a selection of a defined payment method.

* * * * *